United States Patent [19]

Gregor et al.

[11] Patent Number: 5,553,305

[45] Date of Patent: Sep. 3, 1996

[54] SYSTEM FOR SYNCHRONIZING EXECUTION BY A PROCESSING ELEMENT OF THREADS WITHIN A PROCESS USING A STATE INDICATOR

[75] Inventors: Steven L. Gregor, Endicott, N.Y.; Robert A. Iannucci, Andover, Mass.

[73] Assignee: International Business Machines Corporation, Armonk, N.Y.

[21] Appl. No.: 914,686

[22] Filed: Jul. 15, 1992

Related U.S. Application Data

[63] Continuation-in-part of Ser. No. 868,410, Apr. 14, 1992, abandoned.

[51] Int. Cl.$^6$ ..................................................... G06F 15/16
[52] U.S. Cl. .......................... 395/826; 395/800; 395/840; 395/471; 395/650; 395/775
[58] Field of Search ............................. 395/775, 425, 395/375, 275, 840, 841, 800, 840, 826, 471, 650; 340/172.5

[56] References Cited

U.S. PATENT DOCUMENTS

| | | | |
|---|---|---|---|
| 3,573,736 | 4/1971 | Schlaeppi | 340/172.5 |
| 4,439,829 | 3/1984 | Tsiang | 364/200 |
| 4,503,499 | 3/1985 | Mason et al. | 364/200 |
| 4,583,165 | 4/1986 | Rosenfeld | 364/200 |
| 4,953,078 | 8/1990 | Petit | 364/200 |
| 5,168,554 | 12/1992 | Luke | 395/161 |
| 5,197,138 | 3/1993 | Hobbs et al. | 395/375 |
| 5,226,138 | 7/1993 | Shermis | 395/425 |
| 5,301,295 | 4/1994 | Leary et al. | 395/425 |

FOREIGN PATENT DOCUMENTS 0381655  8/1990  European Pat. Off. .

OTHER PUBLICATIONS

R. A. Iannucci, "A Dataflow/Von Neumann Hybrid Architecture", Ph.D. Thesis, MIT Laboratory for Computer Science, Cambridge, Massachusett Jul. 1988.

Teja, "New Architectures: Novel Computer Designs promise a dramatically faster generation of computers", May 1984, Computer & Electronics, p. 70(3).

Anderson, Thomas E., et al. "The Performance Implications of Thread Management Alternatives for Shared-Memory Multiprocessors," *IEEE Transactions on Computers*, vol. 38, No. 12, Dec. 1989, pp. 1631–1644.

Dietz, Henry, et al. "CRegs: A New Kind of Memory for Referencing Arrays and Pointers," *Proceedings Supercomputing '88*, Nov. 14–18, 1988, Orlando, Florida, pp. 360–367.

Jagannathan, Suresh, et al. "A Customizable Substrate For Concurrent Languages," *ACM Sigplan Notices*, vol. 27, No. 7, Jul. 1992, pp. 55–67.

*Primary Examiner*—Thomas C. Lee
*Assistant Examiner*—Rehana P. Krick
*Attorney, Agent, or Firm*—Heslin & Rothenberg, P.C.

[57] ABSTRACT

A method and system for synchronizing execution by a processing element of threads within a process. Before execution of a thread commences, a determination is made as to whether all of the required resources for execution of the thread are available in a cache local to the processing element. If the resources are not available, then the resources are fetched from main storage and stored in one or more local caches before execution begins. If the resources are available, then execution of the thread may begin. During execution of the thread and, in particular, an instruction within the thread, the instruction may require data in order to successfully complete its execution. When this occurs, a determination is made as to whether the necessary data is available. If the data is available, the result of the instruction execution is stored and execution of the thread continues. However, if the data is unavailable, then the thread is deferred until the data becomes available and a new thread is processed. When deferring a thread, the thread is placed in the memory location which is to receive the required data. Once the data is available, the thread is removed from the data location and placed on a queue for execution and the data is stored in the location.

30 Claims, 12 Drawing Sheets

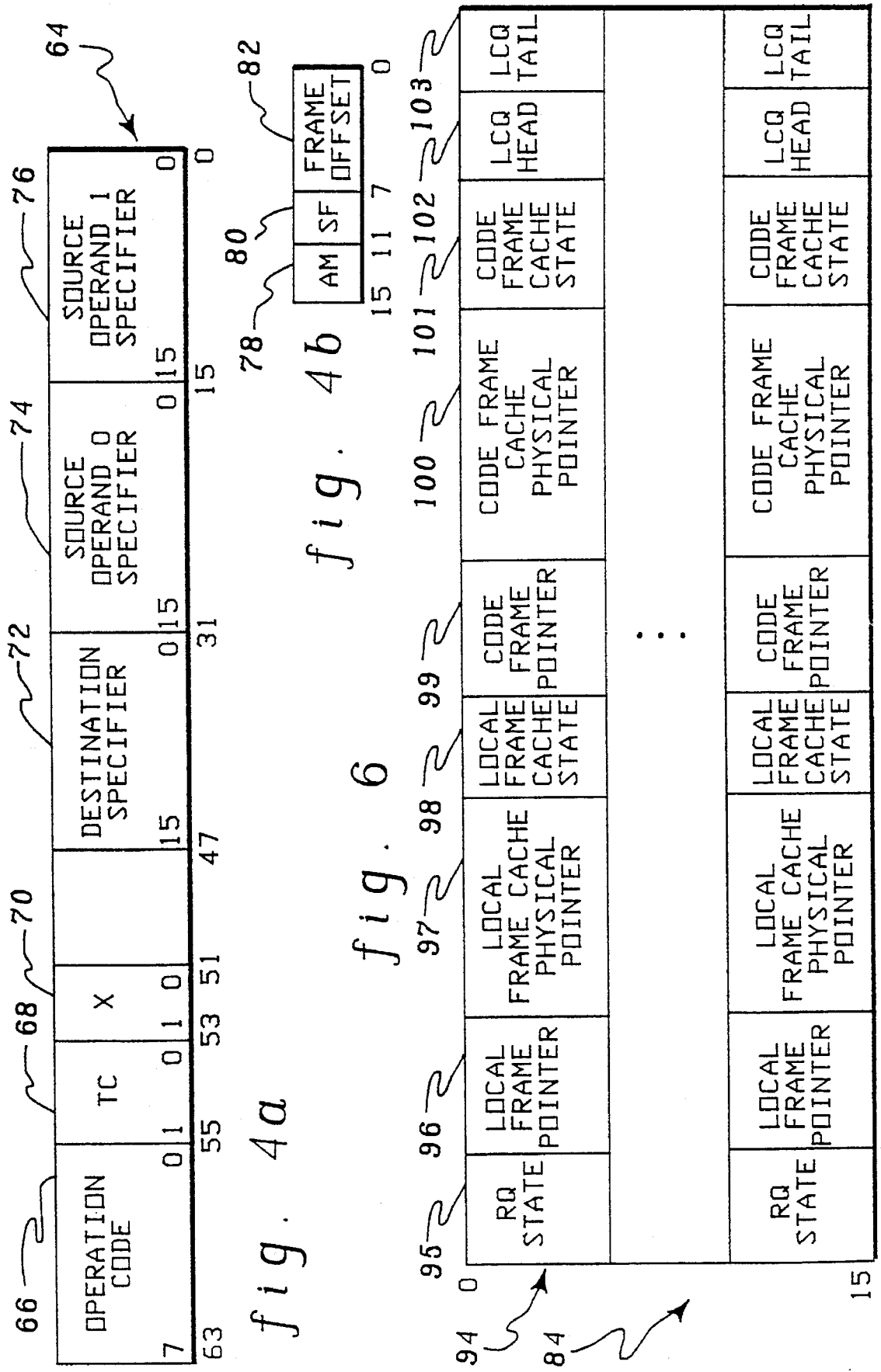

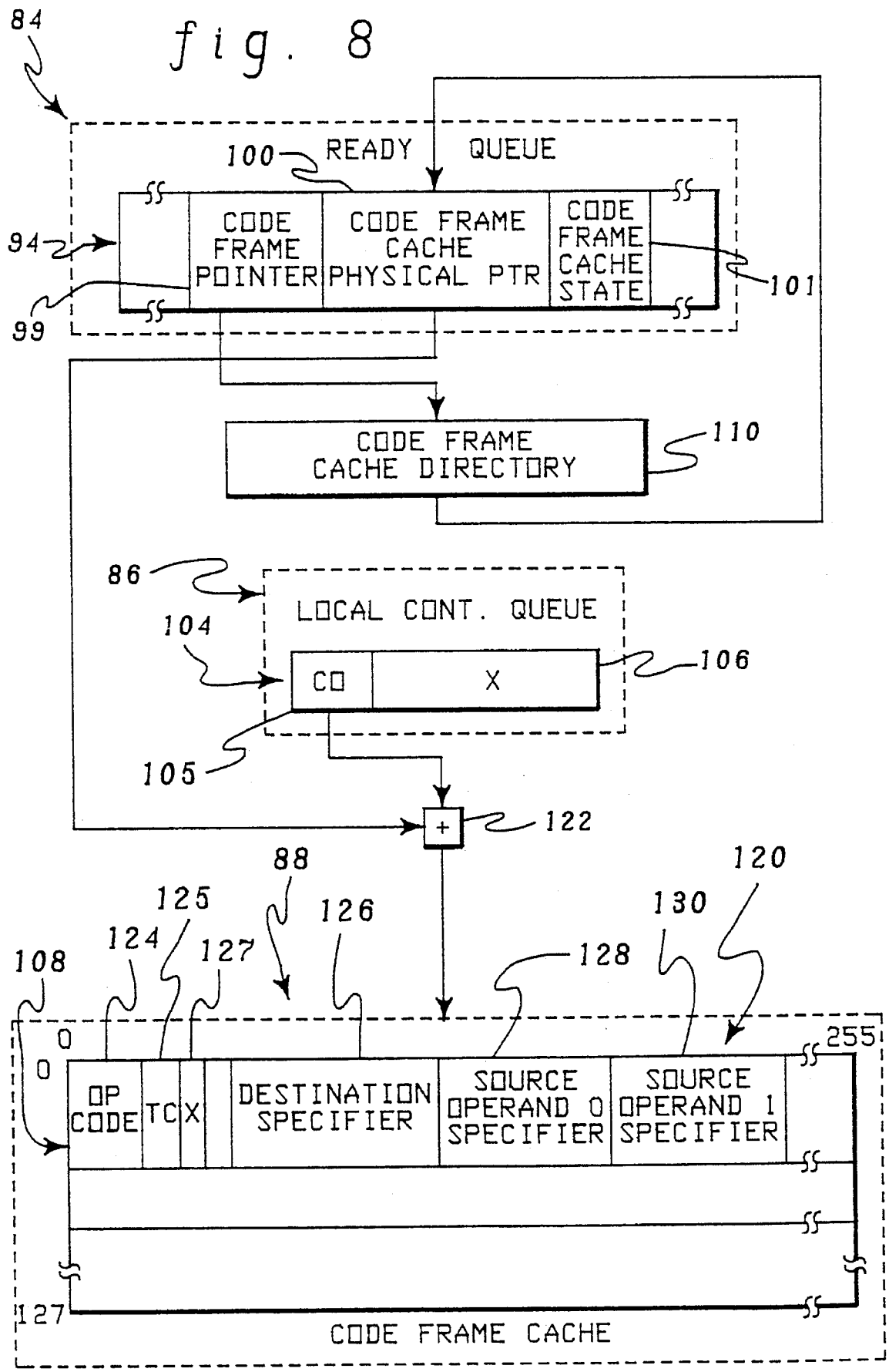

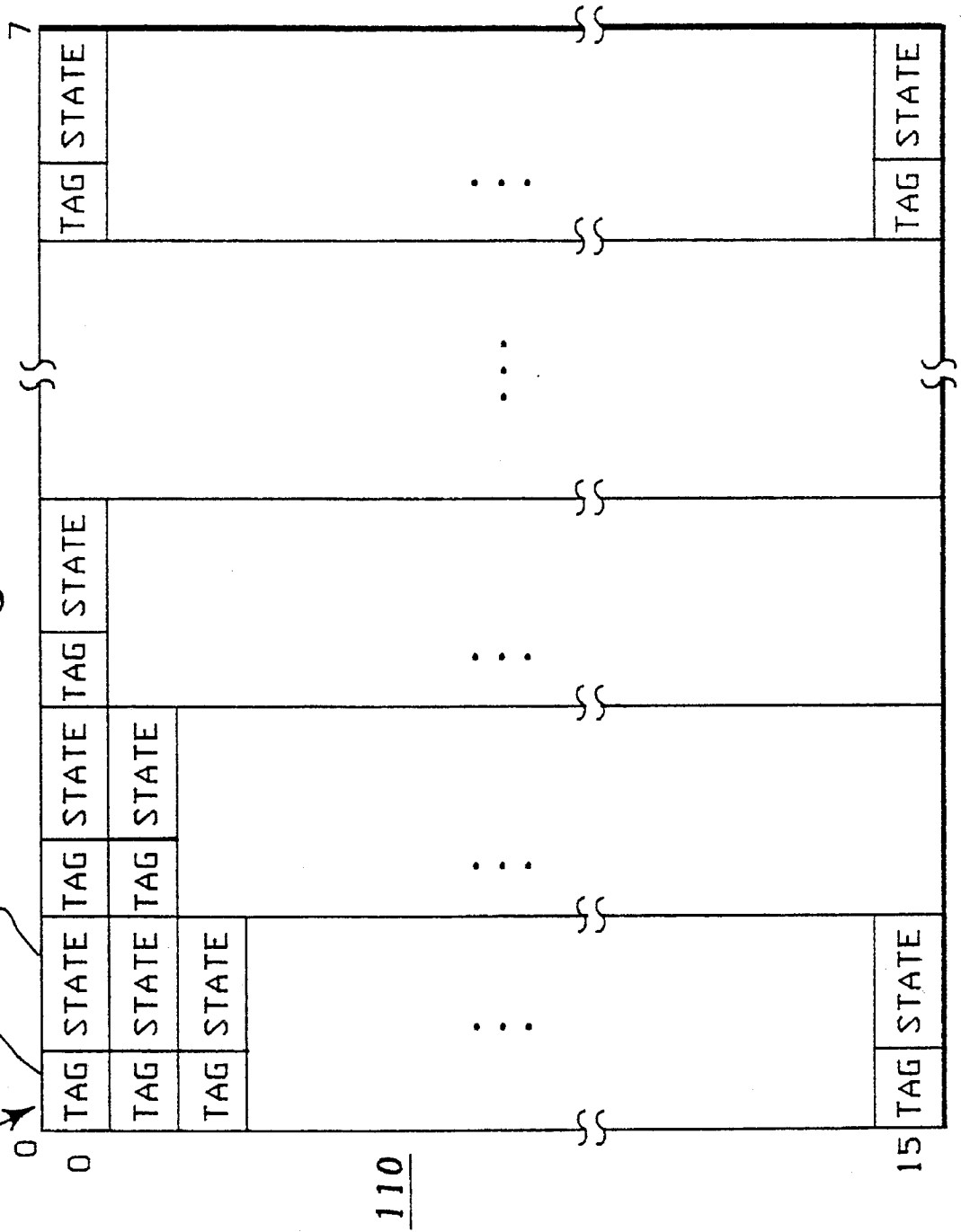

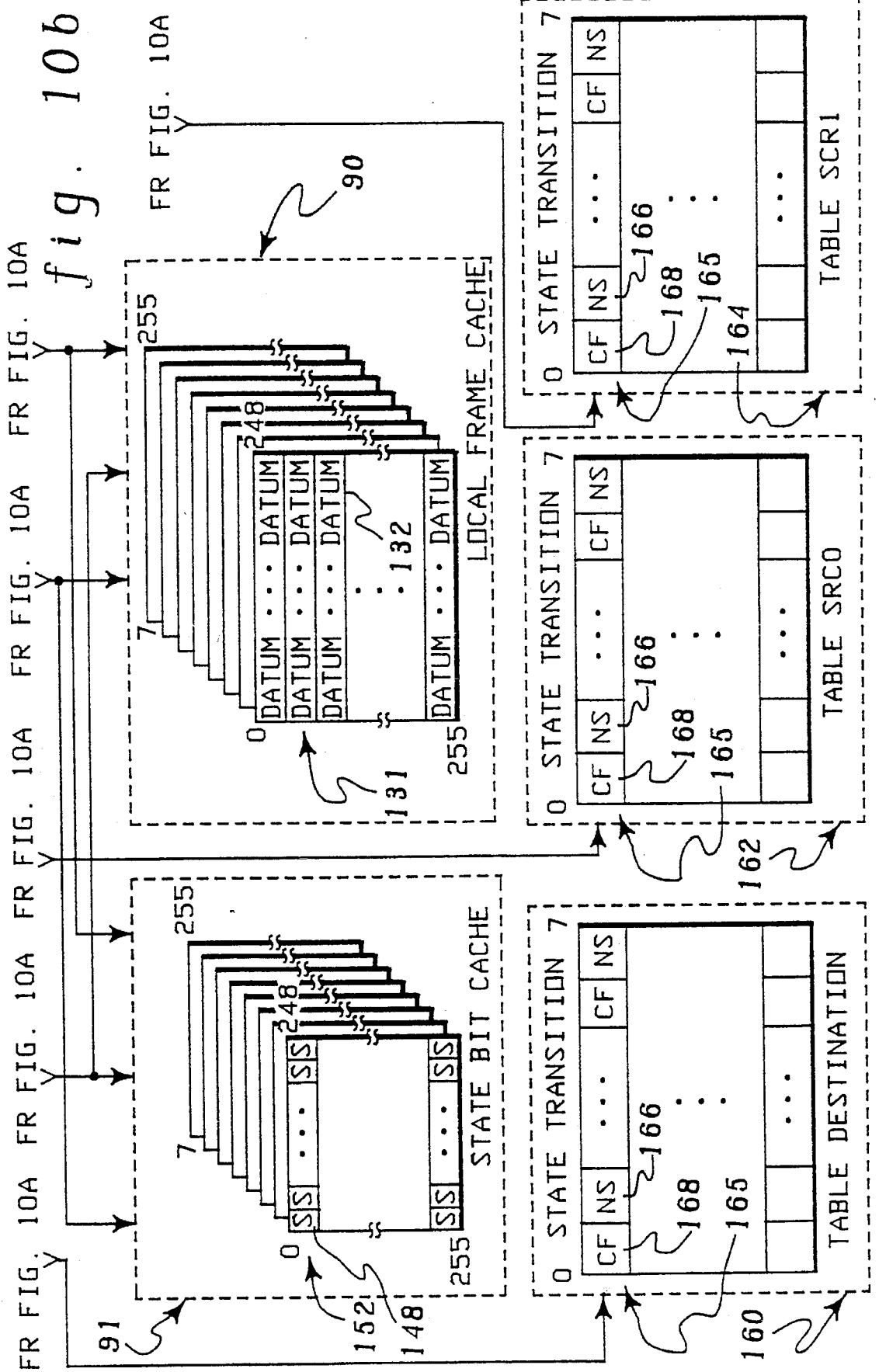

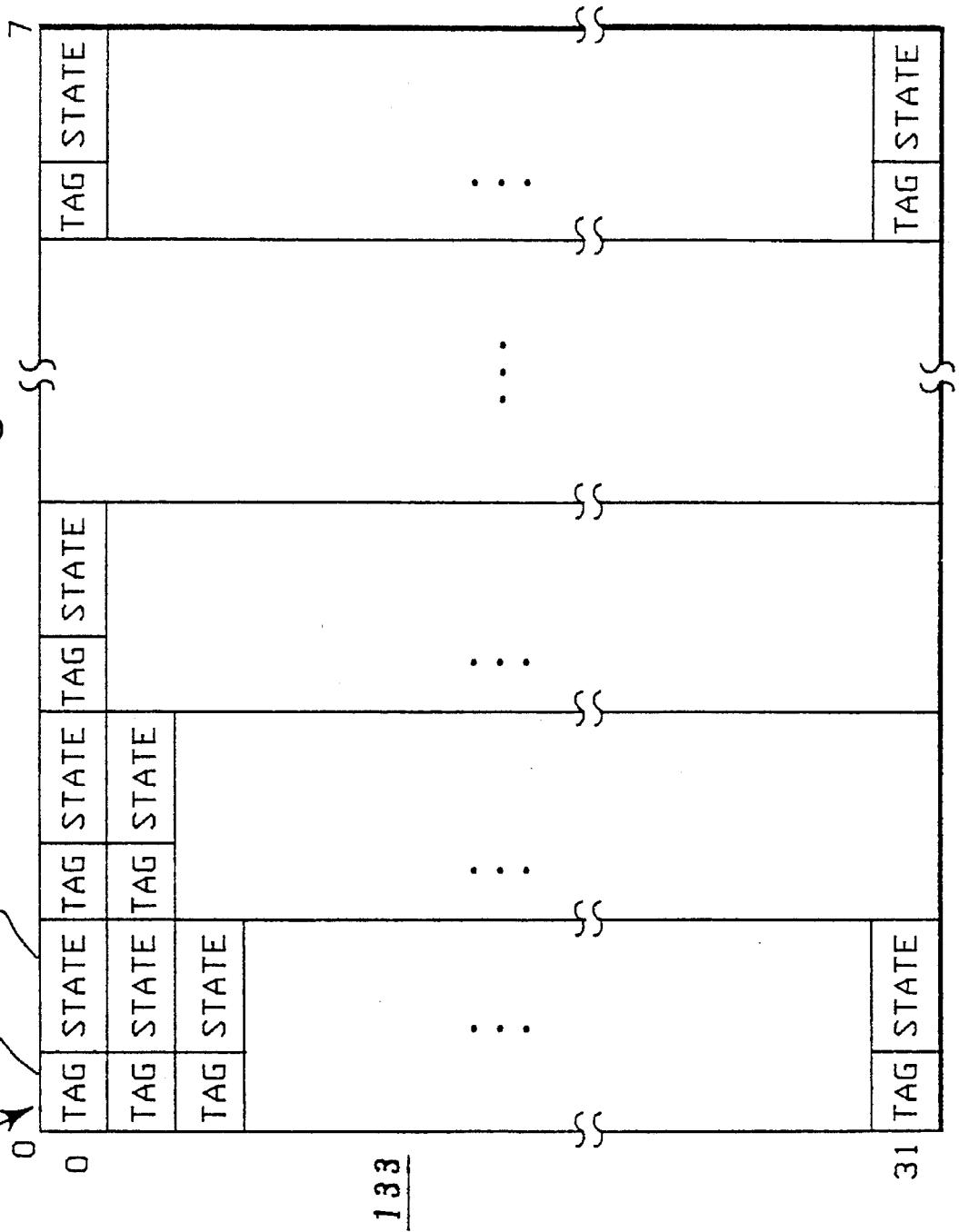

SYSTEM FOR SYNCHRONIZING EXECUTION BY A PROCESSING ELEMENT OF THREADS WITHIN A PROCESS USING A STATE INDICATOR

This is a continuation-in-part of application Ser. No. 868,410, filed on Apr. 14, 1992 now abandoned.

TECHNICAL FIELD

This invention relates in general to data synchronization within a parallel data processing system, and more particularly to the synchronization of threads within a process being executed by a processing element.

BACKGROUND ART

In parallel data processing systems, programs to be executed may be divided into a number of processes which may be executed in parallel by a plurality of processing elements. Each process includes one or more threads and each thread includes a group of sequentially executable instructions. The simultaneous execution of a number of threads requires synchronization or time-coordination of the activities associated with each thread. Without synchronization a processor may sit idle for a great deal of time waiting for data it requires, thereby degrading system performance and utilization.

A thread located in one process is capable of communicating with threads in another process or in the same process and therefore, various levels of synchronization are required in order to have an efficiently executing system with a high degree of system performance.

In order to synchronize the communication of threads located in different processes, a synchronization mechanism, such as, I-structures may be used. I-structures are used in main storage and are described in I-structures: *Data structures for Parallel Computing* by Arvind, R. S. Nikhil and K. K. Pingali, Massachusetts Institute of Technology Laboratory for Computer Science, February 1987.

Synchronization of threads communicating between different processes does not negate the need for a synchronization mechanism used to synchronize threads within the same process. Therefore, a need still exists for an efficient manner to synchronize threads within a process thereby providing greater system utilization and performance. A need also exists for a synchronization mechanism of threads within a process wherein the synchronization mechanism is local to the processing element in which the threads are executed. A further need exists for a synchronization mechanism which does not place a constraint on the number of processes and threads which may be executed by the processing element due to the size of local memory.

DISCLOSURE OF INVENTION

The shortcomings of the prior art are overcome and additional advantages are provided in accordance with the principles of the present invention through the provision of a method and system for synchronizing threads within a process.

In accordance with the principles of the present invention, a method for synchronizing execution by a processing element of threads within a process is provided. The process includes fetching during execution of a thread within a process a datum field from a local frame cache and an associated state indicator from a state bit cache. The state indicator has a first state value which is used to determine whether the datum field includes a datum available for use by the thread. If the datum is unavailable, then execution of the thread is deferred until the datum is available.

In one embodiment, the thread is represented by a continuation descriptor and the step of deferring the thread includes storing the continuation descriptor within the datum field.

In yet another embodiment, the method of synchronizing threads includes awakening the deferred thread when the datum is available for the thread. Awakening includes removing the continuation descriptors stored in the datum field and then placing the datum in the field.

In another aspect of the invention, a system for synchronizing execution by a processing element of threads within a process is provided. The system includes a local frame cache and a state bit cache, means for executing by the processing element a thread within a process and means for fetching from the local frame cache a datum field and from the state bit cache an associated state indicator. The state indicator has a first state value and the system includes means for determining based on the first state value whether the datum field includes a datum available for use by the thread. Should the datum be unavailable, then means for deferring execution of the thread until the datum is available is provided.

In one embodiment, the system further includes means for determining a second state for the state indicator wherein the second state will replace the first state during execution of the thread. The first state may indicate a current state and the second state may indicate a next state.

In another aspect of the invention, a method for synchronizing execution by a processing element of threads within a process is provided. Each thread includes a plurality of instructions and the method includes executing an instruction. During execution of the instruction, at least one source operand is fetched from a local frame cache and at least one corresponding state indicator having a first state is fetched from a state bit cache. Also, fetched from the instruction is at least one state function associated with at least one fetched source operand. The state function is used to select from one of a plurality of tables N possible second states for the state indicator wherein each of the second states has an associated flag indicator. The first state is used to choose from the selected N possible states a second state for the state indicator and the second state replaces the first state during thread execution. The flag indicator specifies one of a plurality of actions for the thread to perform.

In accordance with the principles of the present invention, a method and system for synchronizing threads within a process is provided. The synchronization mechanism of the present invention suspends execution of a thread when data for that thread is unavailable thereby allowing another thread to be executed. This provides for increased system utilization and system performance.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 4a depicts one example of the fields within an instruction located in the code frame of FIG. 4, in accordance with the principles of the present invention;

FIG. 4b depicts one example of the components of the destination and source specifiers of the instruction of FIG. 4a, in accordance with the principles of the present invention;

FIG. 6 depicts one example of the components of a ready queue entry within a ready queue depicted in FIG. 5, in accordance with the principles of the present invention;

FIG. 8 illustrates one example of a block diagram of the components associated with a code frame cache residing within the processing element of the present invention;

FIG. 9 depicts one example of a code frame cache directory associated with the code frame cache of FIG. 8, in accordance with the principles of the present invention;

FIGS. 10a, 10b depict one example of a block diagram of the components associated with a local frame cache located within the processing element depicted in FIG. 5, in accordance with the principles of the present invention;

FIG. 11 depicts one example of a local frame cache directory associated with the local frame cache of FIGS. 10a, 10b, in accordance with the principles of the present invention;

BEST MODE FOR CARRYING OUT THE INVENTION

Figure 1:
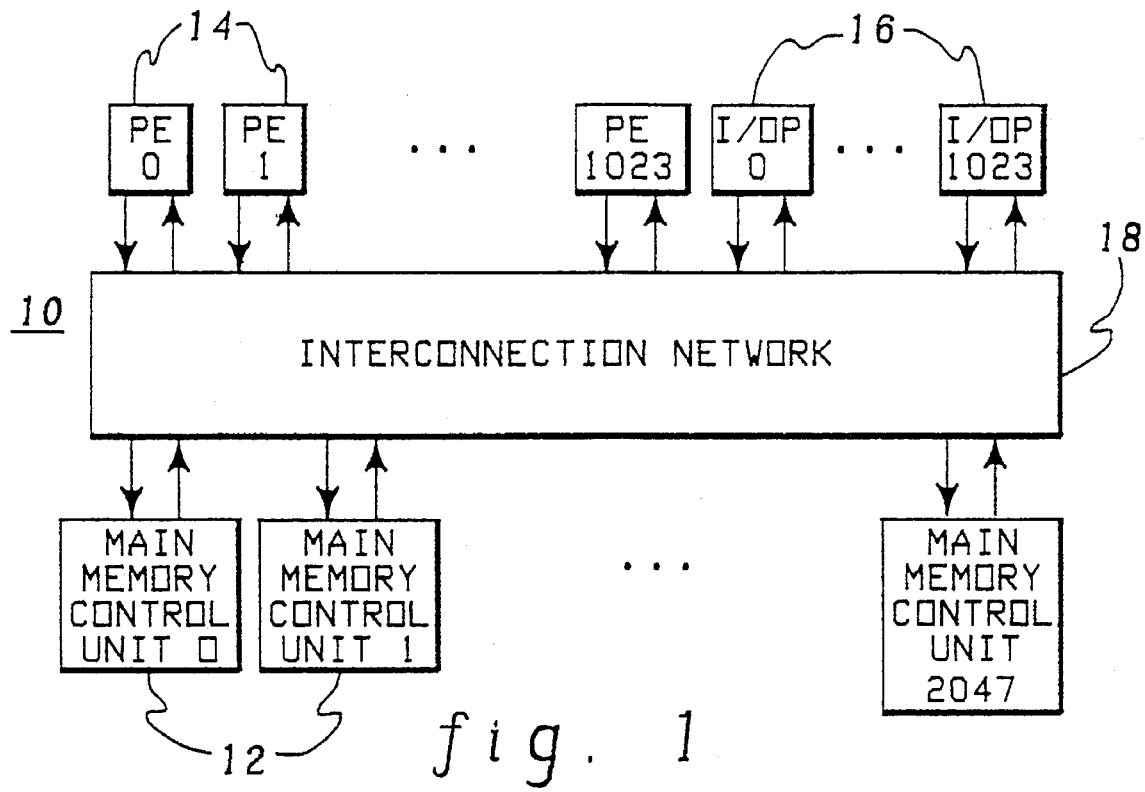
FIG. 1 depicts one example of a block diagram of a parallel processing system, in accordance with the principles of the present invention.

The synchronization mechanism of the present invention resides within a parallel data processing system 10, as depicted in FIG. 1. In one embodiment, parallel data processing system 10 includes one or more main memory control units 12, a plurality of processing elements (PE) 14 and a plurality of input/output processors (I/OP) 16. Processing elements 14 communicate with each other, main memory control units 12 and input/output processors 16 through an interconnection network 18. One example of the main components associated with main memory control units 12 (or main storage) and processing elements 14 are explained in detail below.

Each of main memory control units 12 contains a portion of a sequentially addressed linear memory address space (not shown). The basic unit of information stored in the address space is a word (or memory location) having a unique address across all main memory control units. Contiguous words or memory locations may be combined into a logical structure such as a local frame 20 (FIG. 2), a code frame 22 and a work frame 23. In one embodiment, local frame 20 and work frame 23 generally refer to a group of data words and code frame 22 refers to a group of instructions. There may be a plurality of local frames, work frames and code frames within main memory control units 12. In one embodiment, a particular local frame is associated with a process such that the address of a local frame is used as the identifier of a process.

Figure 3:
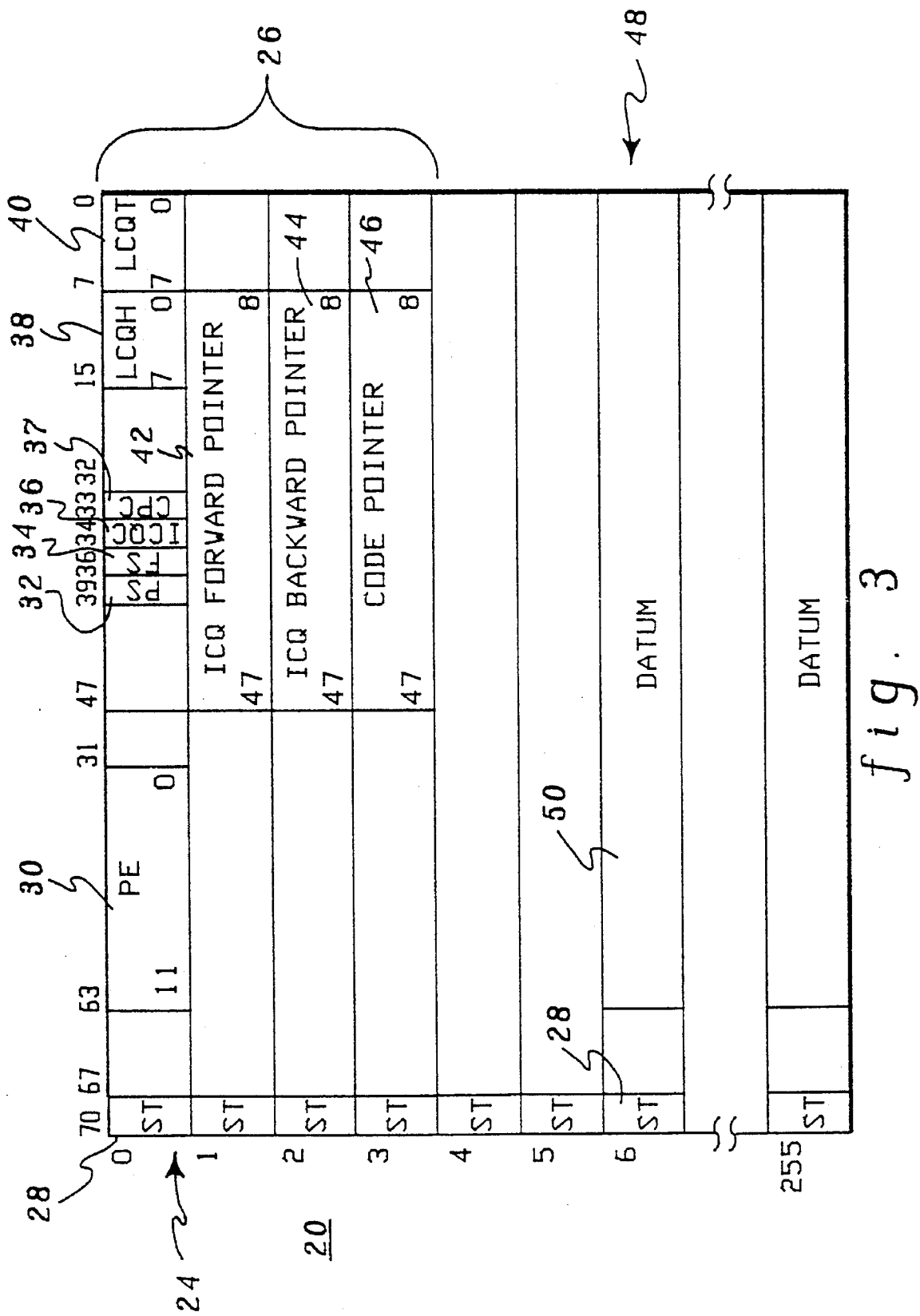
FIG. 3 is an illustration of one embodiment of a logical local frame residing in the main memory control unit of FIG. 2, in accordance with the principles of the present invention.

Referring to FIG. 3, local frame 20 has, in one example, 256 local frame locations 24. The first four locations are reserved for an invocation context map entry 26, which is associated with a process to be executed by one of processing elements 14, the next two slots are reserved for functions not discussed herein and the remainder of the locations (six through 255) are reserved for data local to the process. The information contained within invocation context map entry 26 is established prior to instantiation of the process and includes, for instance, the following fields:

(a) A three bit state indicator (ST) 28 which indicates the current state of a local frame location. As described further below, state indicator 28 is relative to a state function, which is used in accessing the frame location;

(b) A twelve bit physical processing element (PE) number 30 which identifies which processing element is to execute the process;

(c) A three bit process state (PS) 32 which indicates the state of the associated process. A process may have any one of a number of states including, for example: a free state, which is used as a reset state to indicate that the process is no longer active; an inactive state, used to prevent a process from executing; a suspended state, used to prevent any modification to a process so that, for example, the operating system may perform a recovery; an active state in main storage, used to indicate that the process can execute and that it is main memory; or an active state not in main storage, used to indicate that the process can execute and it is within the processing element assigned to execute the process;

(d) A two bit local frame state (FS) 34 which indicates the state of local frame 20. Local frame 20 may have, as an example, one of the following states:
a present state representing that the local frame is present in main storage;
a transient state representing that the local frame is transient between main storage and memory local to the processing element, which is identified by processing element number 30; and
an absent state indicating that references to local frame 20 are to be redirected to the processing element's local memory, as indicated by physical processing element number 30;

(e) A one bit invocation context queue control (ICQC) 36 which indicates the manner in which the process is enqueued onto an invocation context queue (described below) at instantiation;

(f) A one bit cache pinning control (CPC) 37 which indicates whether a code frame or a local frame located within the processing element (e.g., within a code frame cache or a local frame cache, which is described below) is to be pinned.

Figure 2:
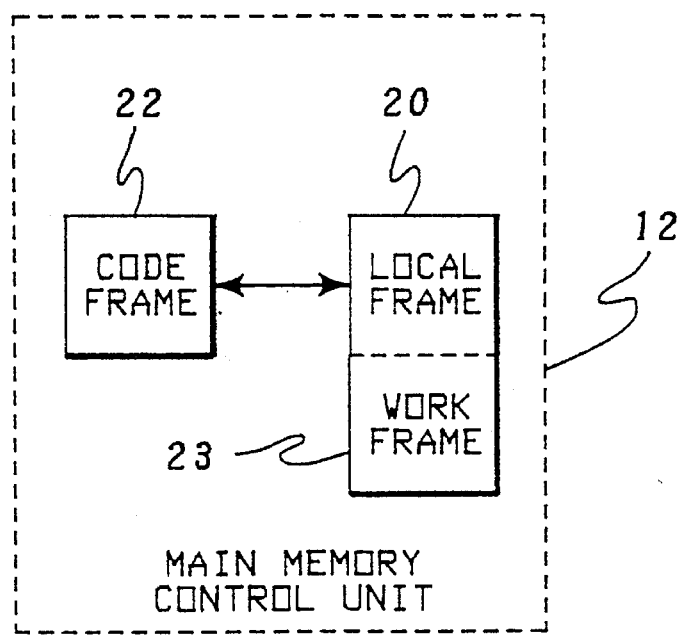
FIG. 2 is one example of the logical components associated with a main memory control unit of the parallel processing system of FIG. 1, in accordance with the principles of the present invention.

(g) An eight bit local continuation queue head (LCQH) pointer 38 which contains an offset into a first entry of work frame 23 (FIG. 2) which is in contiguous memory locations to local frame 20 (described below);

(h) An eight bit local continuation queue tail (LCQT) 40 which contains an offset into the first empty entry at the end of work frame 23;

(i) A forty bit invocation context queue (ICQ) forward pointer 42 which is used in creating a doubly linked list of processes (referred to as an invocation context queue) in main storage for the processing element identified by processing element number 30. The invocation context queue has a head and a tail which are retained within the processing element, and it is ordered based on the enqueue discipline indicated by invocation context queue control 36;

(j) A forty bit invocation context queue (ICQ) backward pointer 44 which is also used in creating the invocation context queue of processes; and (k) A forty bit code frame pointer 46 which specifies the address of a current code frame 22 (FIG. 2).

As previously stated, locations six through 255 of local frame 20 are reserved for data. Each data entry 48 includes state indicator 28 and a 64-bit datum field 50. Datum field 50 contains the data used during execution of the process.

Figure 3A:
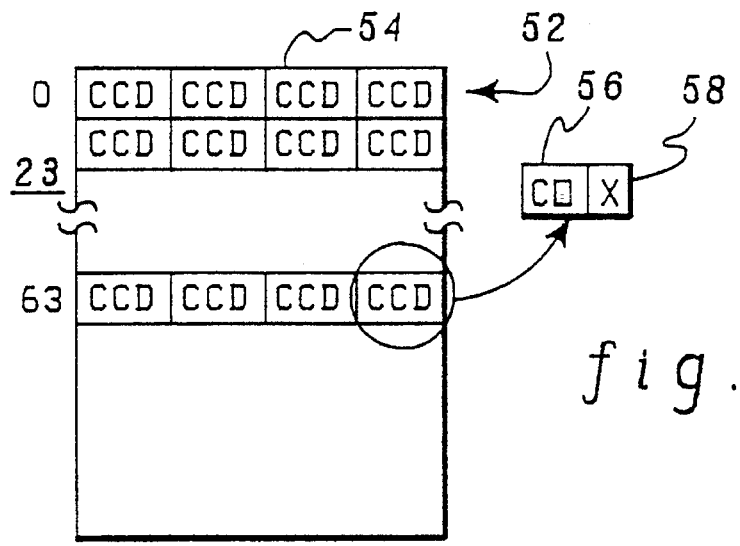
FIG. 3a depicts one example of a logical work frame associated with the local frame of FIG. 3, in accordance with the principles of the present invention.
Figure 3B:
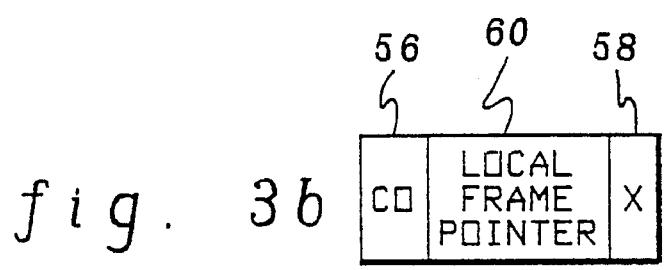
FIG. 3b illustrates one embodiment of the fields contained within a non-compressed continuation descriptor of the present invention.

Referring once again to FIG. 2, coupled to each local frame 20 is a logical structure referred to as work frame 23. Work frame 23 is allocated in the next 256 contiguous locations to local frame 20. Local frame 20 and work frame 23 are managed as a single entity. The first, for example, sixty-four entries or locations 52 of work frame 23 (FIG. 3a) include one or more compressed continuation descriptors (CCD) 54 used, as explained below, in selecting an instruction to be executed or data which is to be used by the instruction. Each compressed continuation descriptor 54 includes, for instance, a code offset 56 and an index 58 (described below). In contrast, a continuation descriptor which is not compressed also includes a local frame pointer 60 (FIG. 3b), which indicates the beginning of local frame 20. A compressed continuation descriptor does not need to store the local frame pointer, since it may be inferred from the main storage address of the local frame/work frame pair. In one embodiment, each location 52 in work frame 23 is capable of storing four compressed continuation descriptors.

Figure 4:
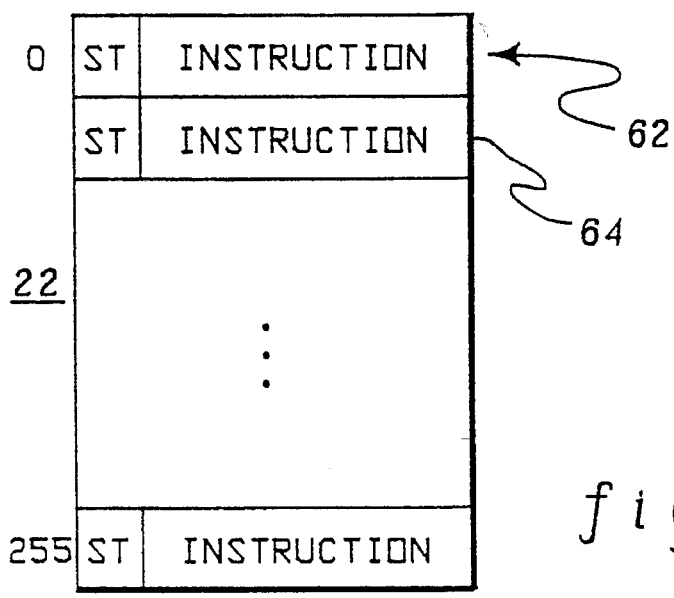
FIG. 4 is an illustration of one embodiment of the entries of a logical code frame residing in main memory control units of FIG. 2, in accordance with the principles of the present invention.

Referring once again to FIG. 2, the local frame/work frame pair is coupled to code frame 22 through code frame pointer 46 of invocation context map entry 26 embedded within local frame 20. Code frame 22 includes, for instance, 256 code frame locations 62 (FIG. 4) and each location includes a word-sized instruction 64 or an inline constant (not shown), which is associated with the process to be executed by processing element 14 as indicated by processing element number 30. Subsequent to loading the instructions or constants (data for constants are stored at code frame generation) into the code frame, the code frame is immutable and thus, may be shared by other processes and processing elements. In one embodiment, code frame 22 is managed in main storage in sequentially addressed and contiguous groupings of sixteen word blocks. This allows for efficient transfer of code frames in main storage to memory locations local within the processing element (e.g., code frame caches, which are described below).

Referring to FIG. 4a, instruction 64 is, for instance 64 bits in length and includes the following fields:

(a) An 8-bit instruction operation code 66 which specifies the operation to be executed by the processing element. The operation code controls the arithmetic/logical units and instruction sequencing. In addition, it also controls network request generation;

(b) A two-bit thread control (TC) 68 which specifies the sequencing controls for the current thread and its successors (a process includes one or more threads of executable instructions) within the processing element in which the threads are being executed. The sequencing may be, for example, sequential instruction dispatch, preventive suspensive submode or end of thread, each of which are described herein.

Sequential instruction dispatch is the mode of execution which entails sequential dispatch of the instructions of a thread being executed by the processing element.

Preventive suspensive submode causes suspension of the current thread at initial dispatch into the processing element of an instruction within the thread. Should the instruction execute successfully, the thread is requeued in a last in-first out fashion onto a local continuation queue of the current process at code offset plus one (described further below). If the thread suspends on a source operand reference, then requeuing of the thread does not take place at this time and deferring of the thread occurs, as described below. Following execution of the instruction, a new thread is dispatched into the processing element.

End of thread indicates to the processing element that the current thread ends after execution of this instruction. When termination of the thread is detected, the processing element switches to the next available thread to be executed. This thread may be from the same process or a higher priority process, which is enqueued LIFO (Last in-First out) after initial dispatch of the current process into the processing element.

(c) A two-bit index increment control (X) 70 which controls the increment of the value of index 58 (FIGS. 3a, 3b) in the current continuation descriptor. When index increment control 70 is set to a nonzero value, index 58 is updated after execution of the current instruction and prior to execution of the succeeding instructions in the same thread.

In one example, index increment control 70 may indicate no change in the value of index 58 from this instruction to the next or it may indicate the incremental value is plus one or minus one;

(d) A sixteen bit destination specifier 72 is an address which indicates, for instance, the target of the instruction execution's result; and (e) A sixteen bit source operand 0 specifier 74 and a sixteen bit source operand 1 specifier 76. Source operand specifiers 74, 76 are addresses which enable source operands to be obtained for the execution functions within the processing element.

Destination specifier 72 and source operand specifiers 74 and 76 each contain the following fields, as depicted in FIG. 4b:

(a) A four bit addressing mode field (AM) 78 used to encode the various sources (including, for example, signed literal, indexed signed literal, local frame cache (described below) or indexed local frame cache), for the instruction operand and destination specifiers. Addressing mode also encodes whether indexed operand addressing is to be used.

(b) A four bit state function field (SF) 80. In one embodiment, instructions accessing locations within a local frame cache (described further below) include for each source operand specifier and the destination specifier a state function used in indicating the synchronization function being used by that specifier. In accordance with the principles of the present invention, a number of synchronization functions may be supported and, therefore, there is a state function associated with each of the available synchronizing functions. Each state function allows, for example, two interpretations, one for a read access and one for a write access. Examples of the synchronizing functions which may be supported by the present invention include: One-Time Producer, Multiple Consumers (OPMC), which is similar to I-structures and has a write once property. It refers to the production of a data value which may be used by a number of instructions; and Multiple Producer, Single Consumer, which refers to the production of several data values used by one thread. In one embodiment, the resulting actions may be dependent on the state function applied, the current state of the local frame location, and the access type, read or write, as described in detail below.

The state function field is ignored when addressing mode 78 selects, for example, a literal operand.

(c) An eight bit frame offset 82 interpreted as an offset into one of the accessible local frames within a local frame cache (described below) or as a literal operand, as selected by the addressing mode of the source/destination specifier. As explained more fully below, when frame offset 82 is used as a frame offset it can be used directly or it can be initially added to the value of index 58 from the current continuation descriptor, modulo 256. In one embodiment, it is then appended to local frame pointer 60 indicated by addressing mode 78 and a local frame access within the local frame cache is attempted under control of state function 80, described in detail below.

Each code frame 22 within main memory control units 12 may exist in a state of absent or present. These states exist and are managed by software. An absent state indicates that the code frame is not in main storage and therefore, a process requiring the absent code frame is prevented from being instantiated. A present state indicates that the code frame is present in main storage and therefore, an inpage request from a processing element may be serviced. Once the code frame is in this state, it remains in this state until the frame is no longer required and it is returned to free storage under software control.

Figure 5:
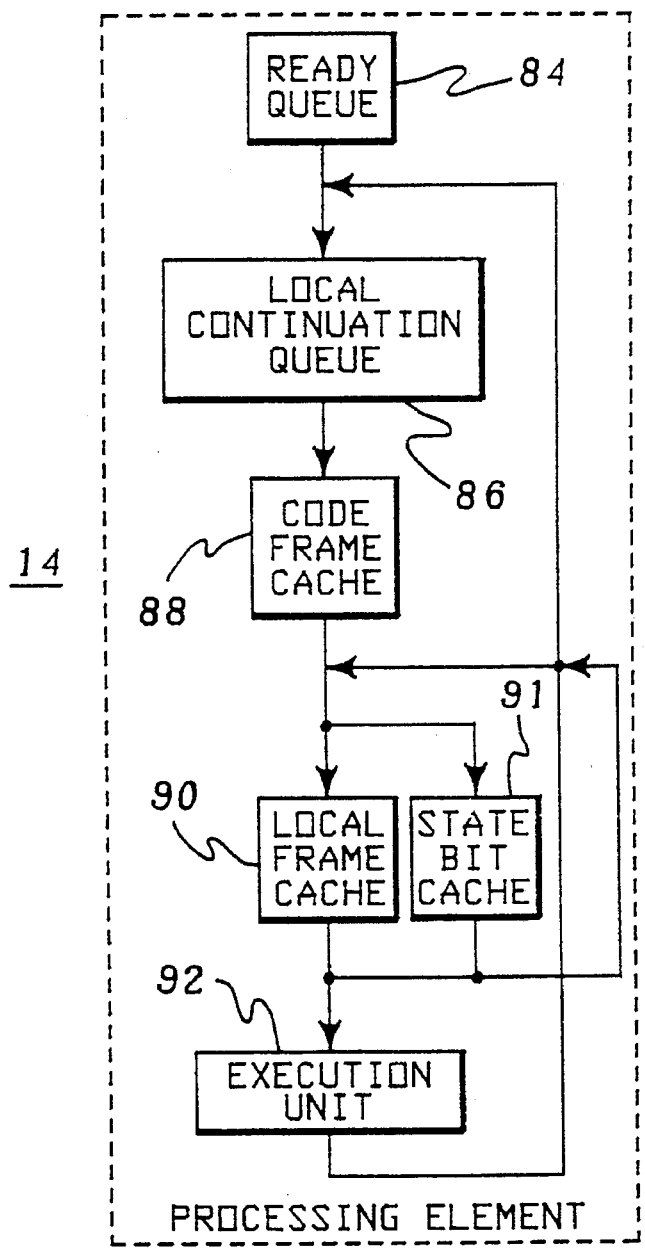
FIG. 5 illustrates one embodiment of a block diagram of the hardware components of a processing element of FIG. 1, in accordance with the principles of the present invention.

Referring once again to FIG. 1, main memory control units 12 are coupled to processing elements 14 through interconnection network 18 (FIG. 1). In accordance with the principles of the present invention, one example of the hardware components associated with each processing element 14 are depicted in FIG. 5 and include the following: a ready queue 84, a local continuation queue 86, a code frame cache 88, a local frame cache 90, a state bit cache 91 and an execution unit 92. Each of these components are described in detail herein.

Ready queue 84 is, for example, a fully associative memory structured essentially as a queue that is capable of being enqueued at the head or the tail depending on the enqueue discipline of the ready queue as specified by invocation context queue control 36. Ready queue 84 includes a number of ready queue entries 94 (FIG. 6) corresponding to processes or invocations to be executed by processing element 14. In one instance, ready queue 84 includes sixteen ready queue entries. As depicted in FIG. 6 and described herein, each ready queue entry 94 includes, for example, the following fields:

(a) A three bit ready queue (RQ) state 95 used to indicate the current state of a ready queue entry. Each ready queue entry may be in one of a number of states, including, for instance, the following: empty, indicating that the entry is unused and available; ready, indicating that the process is ready for execution by the processing element; pending pretest, indicating that the process is awaiting pretesting (described further below); prefetch active, indicating that the required resources for execution of the process are being fetched (this will also be described in detail below); sleeping, indicating that the ready queue entry is valid, but no threads within the process are available for dispatching to the processing element; and running, indicating a thread from the process represented by the ready queue entry is being executed by the processing element;

(b) A local frame pointer 96 is used, for instance, in accessing local frame cache 90, which as described in more detail below, includes the data required for process execution. In addition, local frame pointer 96 is used in determining whether a local frame exists within the local frame cache. Local frame pointer 96 is a copy of local frame pointer 60 and is loaded at the time that the ready queue entry is filled in;

(c) A local frame cache physical pointer 97 is an address into local frame cache 90;

(d) A three bit local frame cache state 98 is used to indicate the current state of a local frame in local frame cache 20. A local frame within the local frame cache may have a number of states including, for example: empty, indicating that the frame state for that local frame is unknown or not present; transient, indicating the local frame is currently being inpaged from main memory control units 12 to local frame cache 90 in processing element 14; and present, indicating the local frame is located in local frame cache 90;

(e) A code frame pointer 99 is used in accessing code frame cache 88. Code frame pointer 99 is a copy of code pointer 46 located in local frame 20;

(f) A code frame cache physical pointer 100 is used to address a block of instructions in code frame cache 88, as described further below;

(g) A three bit code frame cache state 101 is used to determine the current state of a code frame within code frame cache 88. A code frame may have a number of states including, for example: empty, indicating that the frame state for a particular code frame is unknown or not present; transient, indicating the code frame is currently being inpaged from main memory control units 12 to code frame cache 88 in processing element 14; and present, indicating the code frame is located in code frame cache 88.

(h) A local continuation queue head pointer 102 is located in each ready queue entry and is used, as described more fully below, in indicating the head of the list of threads for the particular process to be executed within a processing element. During processing, as described below, local continuation queue head pointer 102 receives its information from local continuation queue head pointer 38 located within invocation context map entry 26 of local frame 20 which is associated with the process to be executed; and (i) A local continuation queue tail pointer 103 is located in each ready queue entry and is used, as described more fully below, in indicating the tail of the list of threads for the particular process. Similar to head pointer 102, local continuation queue tail pointer 103 is received from local frame 20. In particular, during enqueue into the ready queue, local continuation queue tail pointer 40 in local frame 20 is copied into ready queue entry 94.

Figure 7:
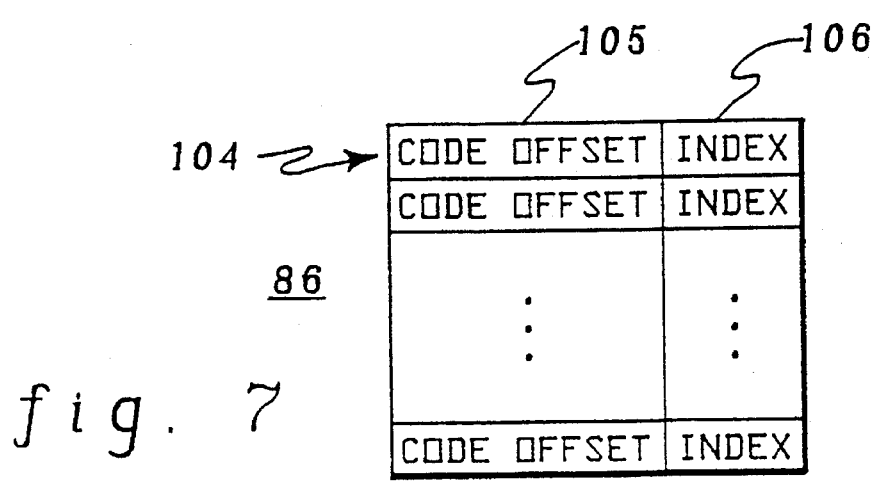
FIG. 7 is one example of the components of a local continuation queue within the processing element of FIG. 5, in accordance with the principles of the present invention.

Associated with each ready queue entry 94 is a local continuation queue 86 (FIG. 5). Each local continuation queue is, for example, a first in-first out queue wherein the top entry in the queue is the oldest. In general, local continuation queue 86 contains all of the pending threads or continuations associated with a process which is on the ready queue. The local continuation queue head and tail pointers located in ready queue entry 94 indicate the valid entries in the local continuation queue for the particular ready queue entry. Depicted in FIG. 7 is one example of local continuation queue 86.

Local continuation queue 86 includes a number of local continuation queue entries 104, in which each entry represents a pending thread for a particular process. Each local continuation queue entry 104 contains a compressed continuation descriptor including a code offset 105 and an index 106, which are received from work frame 23 (i.e, code offset 56, index 58) of main memory control units 12. Code offset 105 is used to address an instruction within a code frame located in code frame cache 88 and index 106 is used during indexed addressing to alter the value of the address used to locate data within cached local frame cache 90.

Local continuation queue 86 is coupled to code frame cache 88 via code frame cache physical pointer 100, as described in detail herein. Referring to FIG. 8, code frame cache 88 includes in one example, 128 code frames 108 and each code frame includes, e.g., 256 instructions. In one embodiment, the code frames located in code frame cache 88 are inpaged from main memory control units 12 to code frame cache 88 during a prefetch stage, described below. Code frame cache 88 supports two simultaneous access ports: a read port used in fetching instructions and a write port used in writing code frames from main storage to the code frame cache.

In order to locate code frame 108, code frame pointer 99 located in ready queue entry 94 of ready queue 84 is input into a code frame cache directory 110 in order to obtain a value for code frame cache physical pointer 100. In one embodiment, code frame cache directory 110 is organized to allow an 8-way set-associative search.

Referring to FIG. 9, code frame cache directory 110 includes, for example, sixteen rows and eight columns and each column and row intersection includes an entry 114. Each entry 114 includes a code frame address tag 116 and a state field 118. Code frame address tag 116 is, for example, the upper thirty-six bits of the 40-bit code frame pointer 99 and is used in determining the address value of code frame cache physical pointer 100. State field 118 is a three-bit field used in indicating the state of a particular code frame 108 within code frame cache 88. A code frame within the code frame cache may have one of the following states:

(a) An empty state which is defined by an unsuccessful attempt within a processing element to locate a particular code frame within the code frame cache. This state is proper when the code frame exists only in main storage or within another processing element. The empty state is recorded in the code frame cache at system initialization and whenever a code frame invalidation occurs.

(b) A transient state which applies to a code frame when it is in a state of motion. For example, the code frame is being moved from main storage to the code frame cache within the processing element (an inpage operation). During inpaging, one of two possible transient states may be recorded for the frame, depending on the desired final state of the code frame at inpage completion. The state is recorded as transient-final state, where final state may be the present state for a pretest/prefetch inpage (described below), or pinned for a pretest/prefetch inpage with invocation context map entry cache pinning control 37 as active. The transient state of a code frame in the code frame cache prevents selection of the code frame by a cache replacement algorithm, such as for example, a least recently used (LRU) algorithm, thereby allowing eventual completion of the inpage operation.

(c) A present state which indicates that the contents of the desired code frame are entirely within code frame cache 88. When the code frame is in this state, then processing element 14 may fetch the instructions located in code frame cache 88.

(d) A pinned state which also indicates that the contents of the desired code frame are entirely within the code frame cache. However, if a code frame is marked as pinned, then replacement of the frame during pretest/prefetch is prevented (described below). In order to remove a pinned code frame from the cache, explicit software action is taken.

Address tag 116 is used in conjunction with code frame pointer 99 to determine an address value for code frame cache physical pointer 100. In particular, the four rightmost bits of code frame pointer 99 (FIG. 8) are used to index into one of the rows within code frame cache directory 110. Subsequent to obtaining a particular row, the contents of each code frame cache address tag 116 within the selected row is compared against the value of bits 12–47 of code pointer 46. If a match is found, then the address value of the code frame cache physical pointer is obtained. In particular, the address of pointer 100 is equal to the row identifier (i.e., the four rightmost bits of code frame pointer 99) and column identifier, which is the binary representation of the column (i.e., columns 0–7) in which the match was found.

Subsequent to determining code frame cache physical pointer 100, the physical pointer is used in conjunction with code offset 105 located in local continuation queue 86 to locate an instruction 120 within code frame 108. In order to select a particular instruction 120 within code frame 108, code frame cache physical pointer 100 is appended at 122 on the left of code offset 105 located in local continuation queue entry 104.

In one embodiment, instruction 120 includes the following fields which are loaded from the copy of code frame 22 located within main storage (the following fields are similar to the instruction fields described with reference to FIG. 4a, and therefore, some of the fields are not described in detail at this point): an operation code (OP CODE) 124, a thread control (TC) 125, an index increment control (X) 127, a destination specifier 126, a source operand zero specifier 128 and a source operand one specifier 130. Destination specifier 126 indicates the address in which the result of the instruction execution is to be written and the source operand specifiers indicate the addresses of the data operands located in local frame cache 90 to be read and used during execution of the instruction.

Figure 10A:
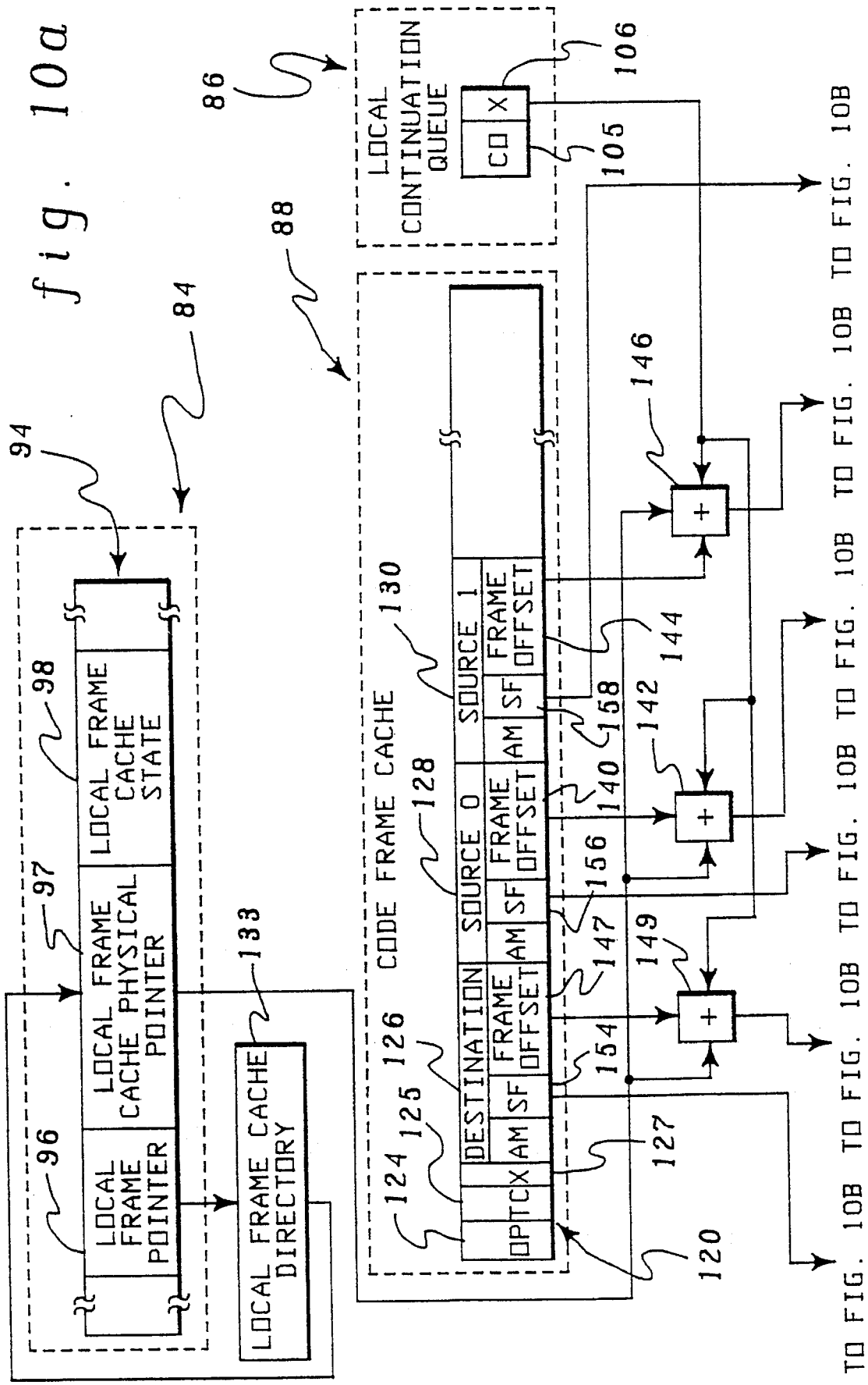

Code frame cache 88 is coupled to local frame cache 90, as described in detail herein. Referring to FIGS. 10a, 10b, local frame cache 90 includes, for example, 256 local frames (131) and each frame includes 256 data words (132) (e.g., invocation context queue information, destination location, source operands). In one embodiment, local frame cache 90 is organized into eight parallel word-wide banks. Each local frame 131 spans across all eight banks such that each bank stores thirty-two words of local frame 131. In one example, the first bank (bank 0) holds the following words of local frame 131: word 0, 8, 16, 32, 40, . . . , 248 (i.e., every eighth word of the local frame); the second bank (bank 1) holds words: 1, 9, 17, 33, 41, . . . , 249 etc. It will be apparent to one of ordinary skill in the art that this is only one way in which the local frame cache may be organized and the invention is not limited to such a way. Local frame cache 90 supports two simultaneous access ports, a read port and a read/write port (not shown). The read port is used for fetching operands and the read/write port is used for storing results from instruction execution and for deferring continuations, as described below.

In one embodiment, the local frames located in local frame cache 90 are inpaged from main memory control units 12 (i.e., datum 50 is inpaged) to local frame cache 90 during a prefetch stage, described below. In order to locate a local frame within the local frame cache (so that inpaged information may be written to a location within the local frame or so that information may be read from a particular location), local frame pointer 96 located in ready queue entry 94 is input into a local frame cache directory 133 in order to obtain an address value for local frame cache physical pointer 97 located in the ready queue entry. (In another embodiment, it is also possible to obtain the local frame cache physical pointer during pretesting (described below), thereby, eliminating the process for obtaining the pointer address from the cache directory.) In one embodiment, local frame cache directory 133 is organized in a similar manner to code frame cache directory 110, i.e., it is organized to allow an 8-way set-associative search.

Referring to FIG. 11, local frame cache directory 133 includes, for example, thirty-two rows and eight columns and each column and row intersection includes an entry 134. Each entry 134 includes a local frame address tag 136 and a state field 138. Local frame address tag 136 is, for example, the upper thirty-five bits of the 40-bit local frame pointer 96 and is used in determining the address value of local frame cache physical pointer 97. State field 138 is a three-bit field used in indicating the state of a particular local frame 131 within local frame cache 90. A local frame within local frame cache may have one of the following states:

(a) An empty state which is defined by an unsuccessful attempt within a processing element to locate a particular local frame within local frame cache 90. This state is valid for a local frame on the main storage free frame list and for one which resides entirely in main storage and is allocated to a process. The empty state may also be detected when a castout from the local frame cache to main storage is in progress for the referenced local frame, resulting in the actual inpage being delayed until castout completion. The empty state is recorded throughout local frame cache at system initialization and within local frame 131 in the cache whenever an attempted local frame inpage replacing a frame in cache is aborted.

(b) A transient state which applies to a local frame when it is in a state of motion, e.g. moving from main storage to the local frame cache (a local frame inpage). During the local frame inpage, the state of the inpaging frame is recorded within local frame cache state 98. During inpage, one of the transient states is recorded for the frame depending upon the desired final state of local frame 131 at inpage completion. The final state may be present for a pretest/prefetch inpage (explained further below) or pinned for a pretest/prefetch inpage with invocation context map entry pinning control 37 active. The transient state in the local frame cache prevents selection of local frame 131 by a local frame cache replacement algorithm (LRU), thereby allowing eventual completion of the inpage operation. This allows completion of any castout associated with the aborted inpage.

(c) A free state which indicates a valid local frame in the local frame cache which is currently not allocated to any process. As one example, a local frame enters this state through process termination.

(d) A present state which indicates that the contents of local frame 131 are entirely within the local frame cache. When the local frame is within this state, the contents are available for access by an instruction within the processing element.

(e) A pinned state which also indicates that the contents of the desired local frame are entirely within the local frame cache. However, if a local frame is marked as pinned, then replacement of the frame by pretest/prefetch is prevented (described below). In order to remove a pinned local frame from the cache, software action is to be taken.

Address tag 136 is used in conjunction with local frame pointer 96 to determine the address value of local frame cache physical pointer 97. In particular, the five rightmost bits of local frame pointer 96 are used to index into one of the rows within local frame cache directory 133. Subsequent to obtaining a particular row, the contents of each local frame address tag 136 within the selected row is compared against the value of bits 13–47 of a logical local frame address (base address of the local frame in main storage). If a match is found, then the address value of local frame cache physical pointer 97 is obtained. In particular, the address of the pointer is equal to the row identifier (i.e., the five rightmost bits of local frame pointer 96) and column identifier, which is the binary representation of the column (i.e., columns 0–7) in which the match was found.

Subsequent to determining local frame cache physical pointer 97, the physical pointer is used along with source operand 0 specifier 128 and index 106 (i.e., the index is used if the addressing mode indicates that index addressing is to be used) to select a datum 132 from local frame cache 90 representative of a source operand 0 to be used during execution of an instruction. That is, a frame offset 140 of source operand 0 specifier 128 (as previously described, each specifier includes an addressing mode (AM), state function (SF) and frame offset) is added at 142 to index 106 and then, local frame cache physical pointer 97 is appended on the left of the summation to indicate a particular datum (e.g., source operand 0) within the local frame cache.

Similarly, local frame cache physical pointer 97 is used with source operand 1 specifier 130 and index 106 to select a datum 132 from local frame cache 90 representative of a source operand 1 also to be used during instruction execution. In particular, a frame offset 144 of source operand 1 specifier 130 is added at 146 to index 106 and then, local frame cache physical pointer 97 is appended on the left of the summation to indicate a particular datum (e.g., source operand 1) within the local frame cache.

In addition to the above, local frame cache physical pointer 97 is also used with destination specifier 126 and index 106 (again, if the index is to be used) to select a datum 132 from local frame cache 90 representative of the location within the local frame cache in which, e.g., the result of the instruction execution is to be stored. In particular, a frame offset 147 of destination specifier 126 is added at 149 to index 106 and then, local frame cache physical pointer 97 is appended on the left of the summation to indicate a particular datum (e.g., a result location) within the local frame cache.

Associated with each datum stored in local frame cache 90 is a 3-bit state indicator 148 located in state bit cache 91. Similar to local frame cache 90, state bit cache 91 includes, for example, 256 locations (152) and each location includes 256 3-bit state indicators 148. In one embodiment, state bit cache 91 is organized into eight word-wide banks accessible in parallel. Each location 152 spans across all eight banks such that each bank stores thirty-two words of location 152. (The organization of the state bit cache is similar to the organization of local frame cache 90, as described in detail above.) In accordance with the present invention, state indicators 148 are inpaged from main storage to state bit cache 91 (i.e., state field 28 of data entry 48 is copied) in parallel with the copying of datum 50 to local frame cache 90.

The state bits are loaded into or read from the state bit cache in a manner similar to that described above for the local frame cache. In particular, as shown in FIGS. 10a, 10b, each of the addresses obtained (e.g., by appending the local frame cache physical pointer on the left of the summation of the particular frame offset and the index, if needed) and used to select a datum 132 (either a source operand or a destination location) from local frame cache 90 is also used to select an associated state bit indicator 148 from state bit cache 91. Each state bit indicator 148 represents the current state of a particular datum. A particular datum and its associated state bit indicator are selected in parallel from local frame cache 90 and state bit cache 91, respectively, using the process described above. However, it will be apparent to one of ordinary skill in the art that the state bit cache may be organized in a number of ways and that only one embodiment is described herein. It will also be apparent to one of ordinary skill in the art that it is also possible to eliminate the state bit cache and place the state bit indicators within the local frame cache, e.g., adjacent to its associated datum.

State bit indicators may have a number of states (as one example, empty, waiting or present) and when an operand and an associated state indicator are selected from local frame cache 90 and state bit cache 91, respectively, the next state for each selected operand is determined. In addition, when a result is to be written to a location, the next state for that location is determined. In one embodiment, in order to determine the next state of an operand or a result location, a plurality of state transition tables and a state function associated with each specifier is used.

In particular, located in instruction 120, is a state function 154 for destination specifier 126, a state function 156 for source operand 0 specifier 128 and a state function 158 for source operand 1 specifier 130. Each of the state functions is used to indicate the synchronization function (described above) associated with its specific specifier and each state function is used as an address into a state transition table. In one embodiment, there is a state transition table for each specifier. That is, there is a state transition table 160 associated with destination specifier 126, a state transition table 162 associated with source operand 0 specifier 128 and a state transition table 164 associated with source operand 1 specifier 130. Located within each of the state transition tables is an entry 165 which includes the possible next states 166 for each of the possible state functions. For example, if state function 154 represents a synchronizing function of One-Time Producer, Multiple Consumer, then located within state transition table 160 (state function 154 indexes into state transition table 160) is entry 165 including the possible next states for that synchronizing function. In one example, each entry may include eight possible next states. Further, if state function 154 could represent another synchronizing function, such as Multiple Producer, Single Consumer, then there would be another entry within state transition table 160 containing the possible next states for that synchronizing function. Similarly, state transition tables 162 and 164 include entries 165 which contain the possible next states 166. Each state transition table is, e.g, located within processing element 14 and may be statically altered at system initialization in any known manner to include additional entries of next states which support further synchronizing functions.

As shown in FIG. 10b, associated with each next state 166 is a 3-bit control flag 168. Control flag 168 is set at system initialization and is fixed for its associated next state. Control flag 168 is used in indicating to the processing element which action is to be taken for the thread which includes instruction 120. That is, control flag 168 indicates, for instance, whether execution of the thread is to be continued or whether execution is to be deferred (explained below).

Figure 12A:
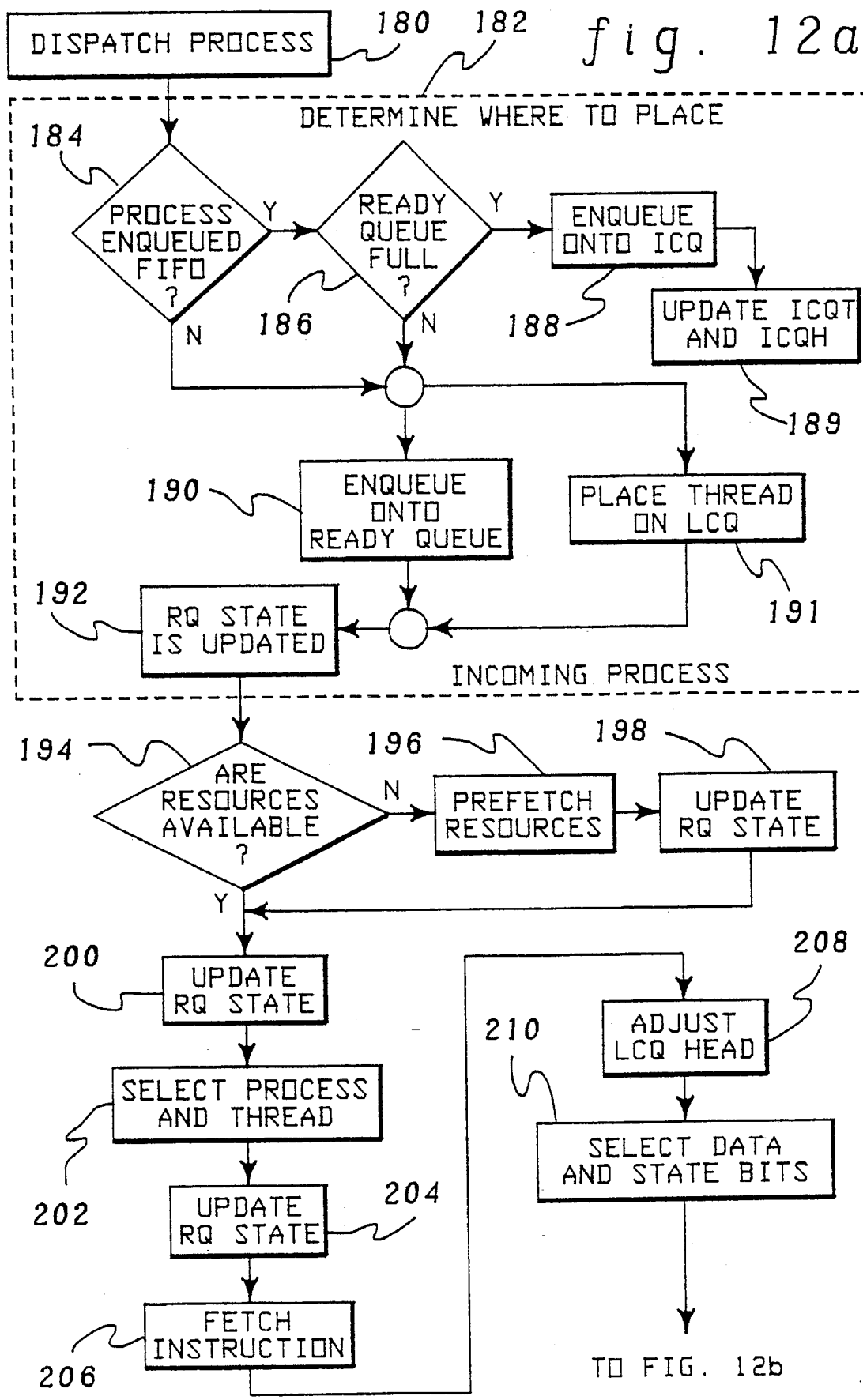
FIGS. 12a, 12b depict one example of a flow diagram of the synchronization process of the present invention.
Figure 12B:
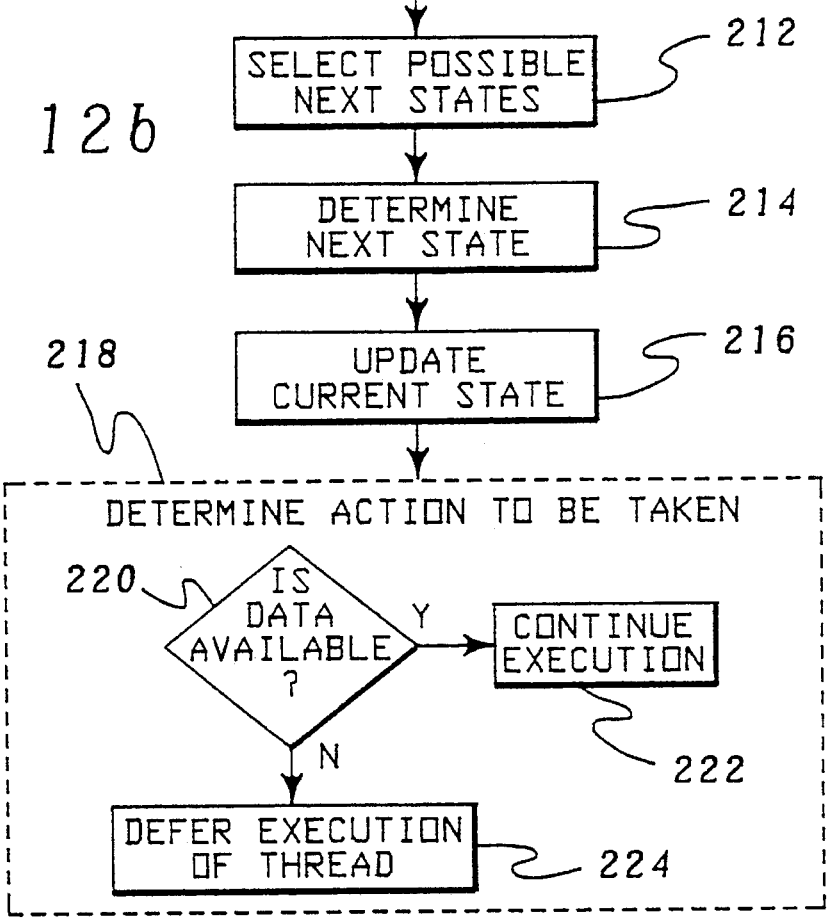

Referring to FIG. 12, in operation, a process to be executed is dispatched by interconnection network 18 to one of processing elements 14, STEP 180 "Dispatch Process." Subsequent to receiving the dispatched process, a decision is made within the processing element as to whether the process is to be placed on the invocation context queue located within the main memory control unit which is associated with the particular processing element or on ready queue 84 located within the processing element, STEP 182 "Determine Where to Place Incoming Process."

In particular, in deciding where to place the process, an initial inquiry is made as to whether the process is to be enqueued on ready queue 84 in a first in-first out manner, INQUIRY 184 "Process Enqueued FIFO?" Should the process be enqueued in a first in-first out manner, then a check is made to see if the ready queue is full and therefore, cannot accept any more processes, INQUIRY 186 "Ready Queue Full?" If the ready queue is full, the process is placed onto the tail end of the invocation context queue in main storage until a position is available in the ready queue, STEP 188 "Enqueue onto ICQ." When placing a process on the tail of the invocation context queue, invocation context queue backward pointer 44 located within invocation context map entry 26 of the process being added is replaced with the current value of the invocation context queue tail. In addition, invocation context queue forward pointer 42 of the last process identified by the old tail is updated to indicate the new tail of the invocation context queue, which is equal to the local frame pointer of the process being added. Further, the invocation context queue tail is set equal to the local frame pointer of the process being added, STEP 189 "Update ICQT and ICQH."

Returning to INQUIRY 186, if, however, the ready queue is not full, then the process is added to the tail end of ready queue 84, STEP 190 "Enqueue onto the Ready Queue." In addition to loading the process onto the ready queue, one or more threads associated with the process, are enqueued onto local continuation queue 86, STEP 191 "Place Thread on LCQ." Subsequently, in order to indicate that there are valid entries in the local continuation queue for the process on the ready queue, local continuation queue head 38 and tail 40 are copied from invocation context queue 26 to local continuation queue head 102 and tail 103 located in ready queue entry 94 designated for that process.

When a process is placed on the ready queue, ready queue state 95 located within ready queue entry 94 is updated from empty to pending pretest, STEP 192 "RQ State is Updated."

Referring back to INQUIRY 184, should a process be enqueued onto ready queue 84 in a last in-first out fashion, then the process is enqueued onto the head of the ready queue with the possibility of replacing a valid ready queue entry 94 at the tail of the ready queue, STEP 190 "Enqueue onto Ready Queue." Once again when the process is added to the ready queue, threads for that process are placed on local continuation queue 86, STEP 191 "Place Thread on LCQ" and ready queue state 95 is updated to pending pretest, STEP 192 "RQ State is Updated." The replaced valid entry may be castout to the head of the invocation context queue in main storage. When adding to the head of the invocation context queue, invocation context queue forward pointer 42 for the new process is updated to point to the old head of the invocation context queue. In addition, invocation context queue backward pointer 44 of the old head is updated to point to the process being added (using local frame pointer). Further, the invocation context queue head is updated to point to the new process represented by the local frame pointer. Also, local continuation queue head 102 and tail 103 are copied from ready queue entry 94 to local continuation queue head 38 and tail 40 in invocation context map entry 26.

As previously mentioned, when a process is added to the ready queue, the state of the ready queue entry is updated from empty to pending pretest. During pending pretest, the availability of the resources required for execution of the process is determined, INQUIRY 194 "Are Resources Available?" In particular, code frame cache 88 is checked to see whether code frame 108 as indicated by code frame pointer 99 in ready queue entry 94 is located within the code frame cache. Similarly, local frame cache 90 is checked to determine if local frame 131 as indicated by local frame pointer 96 in ready queue entry 94 is located within the local frame cache. Should it be determined that code frame 108 or local frame 131 is not present within its respective cache and, therefore, is not available to the process during processing, the missing code frame and/or local frame is inpaged from main storage and thereby made available, STEP 196 "Prefetch Resources." In particular, code frame 108 is copied from code frame 22 in main storage to code frame cache 88 (inpaging). Further, local frame 131 is copied from datum 50 located within local frame 20 in main memory control units 12 to local frame cache 90 and in parallel, state indicator 28 which is associated with the datum is inpaged from main memory control units 12 (i.e., local frame 20) to state bit cache 91. The moving of data between main memory control units and one or more caches allows for the number of processes and threads which can be executed by the processing element to be bound only by the size of main storage and not by a finite amount of local storage. During inpaging, ready queue state 95 is updated from pending pretest to prefetch active, STEP 198 "Update RQ State."

subsequent to inpaging the resources during prefetch or if an affirmative response is obtained from INQUIRY 194, ready queue state 95 is updated from prefetch active to ready indicating that the process is ready for execution by the processing element, STEP 200 "Update RQ State." A ready process may be executed by the processing element when the process is, for example, the top entry in ready queue 84. When the top entry is selected for execution, the top thread located in local continuation queue 86 is selected, STEP 202 "Select Process and Thread." When this occurs, ready queue state 95 is updated from ready to running, STEP 204 "Update RQ State." In addition, the state of the previous running ready queue entry is changed from running to empty, ready or sleeping (all of which are described above) depending on the conditions for which it relinquishes control of processing within the processing element.

The selected thread (or local continuation queue entry 104) from local continuation queue 86 includes code offset 105 which is used, as described above, in selecting an instruction 120 from code frame cache 88 to be executed, STEP 206 "Fetch Instruction." When instruction 120 is fetched, local continuation queue head pointer 102 located in ready queue entry 94 is adjusted to indicate the removal of the processing thread from the local continuation queue, STEP 208 "Adjust LCQ Head."

As described above, the instruction which is selected includes source operand 0 specifier 128 which is used to select datum 132 representative of a source operand 0 from local frame cache 90 and its associated state bit 148 from state bit cache 91. Also, source operand 1 specifier 130 is used to select datum 132 representative of a source operand 1 from local frame cache 90 and its associated state bit 148 located in state bit cache 91, STEP 210 "Select Data and State Bits."

In addition to the above, state functions 156 and 158 located in source operand 0 specifier 128 and source operand 1 specifier 130, respectively are used in selecting a number of possible next states 166 from state transition tables 162, 164. In particular, state function 156 is used as an address into state transition table 162 to select entry 165 which includes the next states for source operand 0 specifier. Similarly, state function 158 is used as an address into state transition table 164 to select entry 165 which includes the next states for source operand 1 specifier, STEP 212 "Select Possible Next States." (As described above, each state function is representative of a synchronizing function and the states associated with each synchronizing function are included in the state transition tables.)

Subsequent to selecting the possible next states for a source operand, the current state (state indicator 148) of the operand is used in choosing one state from the possible next states which represents the next state for that operand. For example, if there are eight next states (0–7) and the value of state bit indicator 148 is zero, then the next state for state indicator 148 is the state located at position 0 of the eight next states (i.e., column 0 or the first next state out of the eight states), STEP 214 "Determine Next State." In one embodiment, for a particular synchronizing function, it may be that state bit indicator 148 represents a present state for an operand which has been read and the possible next states for a particular synchronizing function are empty, waiting and present. In one example, the next state to be selected for that operand is the present state. After the next state is determined, state indicator 148 is updated to the value of the next state, e.g., by writing the value of the next state into the current state value located in state bit cache 91, STEP 216 "Update Current State."

In addition to the above, a determination is made as to the course of action to be taken by the thread which includes the instruction being executed, STEP 218 "Determine Action to be Taken." Types of actions which may be taken include, for instance, continue with thread execution, suspend current thread and awaken deferred thread, each of which are explained below.

In one embodiment, in order to determine what action is to be taken by the thread, an inquiry is made into whether the data (e.g., source operand 0 and/or source operand 1) located in local frame cache 90 and selected by executing instruction 120 is available for use by the instruction, INQUIRY 220 "Is Data Available?" In particular, this determination is made by checking state indicator 148 (before it is updated to the next state) associated with each of source operands 0 and 1. Should state indicator 148 indicate, for instance, that an operand is in an empty state, then that operand is considered unavailable. If, however, state indicator 148 indicates that each operand is in, for example, a present state, then the operands are considered available. If the data is available, then execution of the thread continues and the result of the executing instruction is stored in a result location within local frame cache 90, STEP 222 "Continue Execution," as described in detail herein.

In one example, instructions are executed within execution unit 92, which is coupled to local frame cache 90 within processing element 14. Addressing mode 78 of each source operand specifier located in instruction 120 gates the appropriate data, such as source operand 0 and source operand 1 (which has been obtained as described above), into input registers (not shown) of execution unit 92. Execution unit 92 executes the instruction using the obtained operands and places the result in a destination (or result) location located within local frame cache 90 indicated by destination specifier 126 of instruction 120. If, however, the result of the instruction execution is a branch to a specific location, then a new thread (in particular, a new compressed continuation descriptor) may be enqueued onto local continuation queue 86 (if the thread is for the same process that is currently being executed) or a new thread may be handled by interconnection network 18 and enqueued onto a different process' local continuation queue.

On the other hand, if the answer to INQUIRY 220 is in the negative and one or more of the source operands are not available (e.g., the state indicator associated with that operand indicates the operand is not in a present state), then execution of the thread associated with the executing instruction is deferred, STEP 224 "Defer Execution of Thread." (In one example, the particular instruction continues executing, but the results are not stored.) In particular, if source operand 0 or source operand 1 is in, for example, a state of empty or waiting and therefore, unavailable (if both operands are unavailable, then in one embodiment, operand zero is preferred over operand one), then the thread currently executing (represented by code offset 105 and index 106 in local continuation queue entry 104 within local continuation queue 86) is suspended until source operand 0 and source operand 1 (if both are needed) are available. When suspension occurs, any affects of the instruction are nullified.

In order to suspend execution of a thread, code offset 105 and index 106 (also referred to as the compressed continuation descriptor) located within the local continuation queue are stored in the datum location (or field) representative of the unavailable source operand. Each datum 132 may receive a number of compressed continuation descriptors corresponding to a number of threads. In one example, each datum may store four compressed continuation descriptors.

Figure 13:
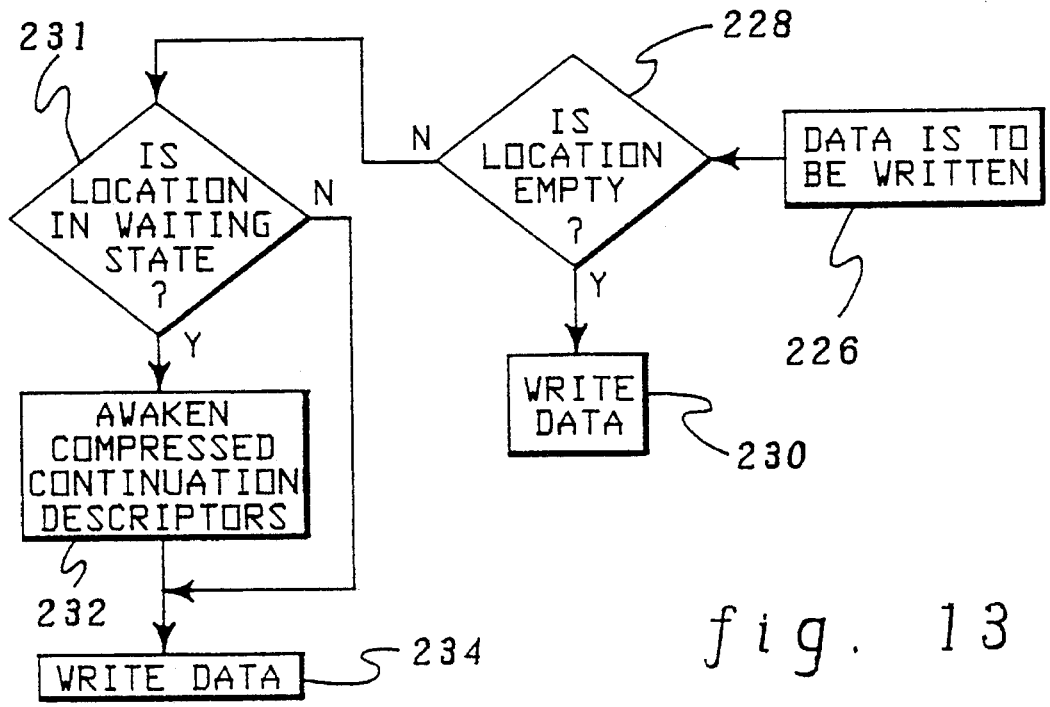
FIG. 13 depicts one example of a flow diagram of the processes associated with writing data to a location in a cache, in accordance with the principles of the present invention.

When data is to be written to a datum location 132 within local frame cache 90, the result location and its associated state indicator are specified, as described in detail above, by frame offset 147 of destination specifier 126 located within code frame cache 88, local frame cache physical pointer 97 and any corresponding index 106, STEP 226 "Data is to be Written" (FIG. 13) In addition to selecting the location and the state indicator, state function 154 located in destination specifier 126 is used as an address into state transition table 160 to select a number of possible next states 166 for the result location (similar to the procedure described above for selecting the next state for the source operands). As described above, subsequent to selecting the possible next states for the result location, the current state indicator 148 for that location is used to choose the next state for the location. The current state indicator is then updated to reflect the value of the next state.

In addition to the above, a determination is made as to whether the result location is empty, INQUIRY 228 "Is Location Empty?" (When data is to be written, a read/write port is used, since the location is initially read to determine if anything is stored there before data is written to the location.) Should chosen datum 132 be empty (as indicated by state indicator 148 before it is updated to the next state), then the data is written to that location, STEP 230 "Write Data." On the other hand, if the location is not empty, a determination is made as to whether there is one or more compressed continuation descriptors stored within the location and, therefore, the location is in a waiting state (again, as indicated by state indicator 148), STEP 231 "Is Location in Waiting State?" If the location is not in the waiting state, then the data is written, STEP 234 "Write Data." If, however, that location is in a waiting state, then any and all compressed continuation descriptors stored in that location are removed and enqueued onto the local continuation queue associated with the running process before the data is written, STEP 232 "Awaken Compressed Continuation Descriptors." Subsequent to removing the compressed continuation descriptors, the data is written to the indicated location, STEP 234 "Write Data."

In one specific embodiment, each next state resident within state transition tables 160, 162, 164 has an associated 3-bit control flag 168 which is retrieved when the possible next states are retrieved. When one of the next states is selected, as described above, the associated control flag 168 is also selected and is used to indicate what action is to be taken by the processing element. That is, the control flag indicates, for example, whether thread execution is to be continued, whether execution of the thread is to be deferred or whether a deferred thread is to be awakened. Each of these actions is performed in the manner described above.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for synchronizing execution by a processing element of threads within at least one process, said method comprising the steps of:

executing a first thread and a second thread within the at least one process on said processing element, said processing element having associated therewith at least a portion of a main memory;

fetching during said first thread execution from a local frame operand cache a datum field;

fetching from a state bit cache a state indicator, said state indicator being associated with said datum field and having a first state value;

determining based on said first state value whether said datum field includes a first datum comprising an operand available for use by said first thread;

deferring execution of said first thread when said first datum is unavailable and continuing execution of said second thread on said processing element; and determining a second state for said state indicator, said second state replacing said first state during said first thread execution;

wherein said second state determining step includes the steps of:

selecting from said first thread a state function to be used in determining said second state;

using said state function to select from one of a plurality of tables one or more possible second states for said indicator; and using said first state to choose from said one or more possible second states said second state for said indicator.

2. The method of claim 1, wherein said first state represents a current state of said first datum and said second state represents a next state of said first datum.

3. The method of claim 1, wherein said first thread is represented by a continuation descriptor and said deferring step includes the step of storing said continuation descriptor within said datum field.

4. The method of claim 3, wherein said continuation descriptor is compressed before being stored in said datum field and said datum field can receive a plurality of said compressed continuation descriptors.

5. The method of claim 4, further including the step of awakening said deferred first thread when said first datum is available for said first thread.

6. The method of claim 5, wherein said awakening step includes the step of removing said compressed continuation descriptors from said datum field.

7. The method of claim 6, wherein said removed compressed continuation descriptors are stored on a queue local to said processing element.

8. The method of claim 6, wherein said awakening step further includes the step of storing said first datum in said datum field when said compressed continuation descriptors are removed.

9. A system for synchronizing execution by a processing element of threads within at least one process, said system comprising:

a local frame operand cache, said local frame operand cache including a datum field;

a state bit cache, said state bit cache including a state indicator corresponding to said datum field;

means for executing by said processing element a first thread and a second thread within the at least one process, said processing element having associated therewith at least a portion of a main memory;

means for fetching from said local frame cache said datum field and from said state bit cache said state indicator having a first state value;

means for determining based on said first state value whether said datum field includes a first datum comprising an operand available for use by said thread;

means for deferring execution of said first thread when said first datum is unavailable and continuing execution of said second thread on said processing element; and means for determining a second state for said state indicator, said second state replacing said first state during said first thread execution;

wherein said second state determining means comprises:
means for selecting from said first thread a state function to be used in determining said second state;

a plurality of tables each having one or more possible second states for said indicator;

means for using said state function to select from one of said plurality of tables said one or more possible second states; and means for using said first state to choose from said one or more possible second states said second state for said indicator.

10. The system of claims 9, wherein said first state represents a current state of said first datum and said second state represents a next state of said first datum.

11. The system of claim 10, further comprising a main storage, said main storage comprising a copy of said datum field and a copy of said state indicator, said copy of said datum field being copied from main storage to said local frame cache and said copy of said state indicator being copied from said main storage to said state bit cache.

12. The system of claim 9, wherein said thread is represented by a continuation descriptor and said means for deferring comprises means for storing said continuation descriptor within said datum field.

13. The system of claim 12, wherein said continuation descriptor is compressed before being stored in said datum field and said datum field can receive a plurality of said compressed continuation descriptors.

14. The system of claim 13, further including means for awakening said deferred first thread when said first datum is available for said first thread.

15. The system of claim 14, wherein said awakening means comprises removing said compressed continuation descriptors from said datum field.

16. The system of claim 15, further comprising a queue local to said processing element and wherein said removed compressed continuation descriptors are stored on said queue.

17. The system of claim 15, wherein said means for awakening further comprises means for storing said first datum in said datum field when said compressed continuation descriptors are removed.

18. A method for synchronizing execution by a processing element of threads within at least one process, each of said threads including a plurality of instructions, said method comprising the steps of:

executing an instruction of said thread on said processing elements, said processing element having associated therewith at least a portion of a main memory;

fetching during said instruction execution from a local frame operand cache at least one source operand and from a state bit cache at least one state indicator having a first state value, said at least one state indicator corresponding to said at least one source operand;

fetching from said instruction at least one state function associated with said at least one fetched source operand;

using said at least one state function to select from one of a plurality of tables one or more possible second states for said at least one state indicator, each of said second states having a corresponding flag indicator;

using said first state to choose from said one or more possible second states a second state for said state indicator; replacing said first state with said second state during said thread execution; and having said thread perform one of a plurality of actions after said instruction execution, said action being specified by said flag indicator associated with said chosen second state.

19. The method of claim 18, wherein said plurality of actions includes the following actions: continuing execution of said thread, deferring execution of said thread and awakening a deferred thread.

20. The method of claim 19, wherein said thread is represented by a continuation descriptor and said deferring execution action includes the step of storing said continuation descriptor within a source operand.

21. The method of claim 20, wherein said continuation descriptor is compressed before being stored and said source operand can receive a plurality of compressed continuation descriptors.

22. The method of claim 21, wherein said awakening action includes the step of removing a compressed continuation descriptor from a source operand.

23. The method of claim 22, wherein said awakening action further includes the step of storing a source operand when said compressed continuation descriptor is removed.

24. The method of claim 22, wherein said removed continuation descriptor is stored on a queue local to said processing element.

25. A system for synchronizing execution by a processing element of threads within at least one process, each of said threads including a plurality of instructions, said system comprising:

means for executing an instruction of said thread on said processing element, said processing element having associated therewith at least a portion of a main memory;

a local frame operand cache, said local frame operand cache including a plurality of source operands;

a state bit cache, said state bit cache including a plurality of state indicators, each of said state indicators having a first state value, and wherein one of said state indicators corresponds to one of said source operands;

means for fetching during said instruction execution from said local frame operand cache at least one source operand and from said state bit cache at least one corresponding state indicator;

means for fetching from said instruction at least one state function associated with said at least one source operand;

a plurality of tables each having one or more possible second states for each of said state indicators;

means for using said at least one state function to select from one of said plurality of tables said one or more possible second states, each of said second states having an associated flag indicator;

means for using said first state to choose from said one or more possible second states a second state for said state indicator;

means for replacing said first state with said second state; and means for having said thread perform one of a plurality of actions, said action being specified by said flag indicator associated with said chosen second state.

26. The system of claim 25, wherein said plurality of actions includes means for continuing execution of said thread, means for deferring execution of said thread and means for awakening a deferred thread.

27. The system of claim 26, wherein said thread is represented by a continuation descriptor and said means for deferring includes means for storing said continuation descriptor within said at least one source operand.

28. The system of claim 27, further comprising means for compressing said continuation descriptor before said continuation descriptor is stored and wherein said at least one source operand can receive a plurality of said compressed continuation descriptors.

29. The system of claim 28, wherein said means for awakening includes means for removing said compressed continuation descriptors from said at least one source operand.

30. The system of claim 29, further comprising a queue local to said processing element and wherein said removed continuation descriptors are stored on said queue.

* * * * *

UNITED STATES PATENT AND TRADEMARK OFFICE
CERTIFICATE OF CORRECTION

PATENT NO. : 5,553,305
DATED : September 03, 1996
INVENTOR(S) : Gregor et al.

It is certified that error appears in the above-indentified patent and that said Letters Patent is hereby corrected as shown below:

Column 15, line 62, delete "subsequent to" and substitute therefor --Subsequent to--.

Signed and Sealed this

Eighteenth Day of March, 1997

Attest:

BRUCE LEHMAN

Attesting Officer     Commissioner of Patents and Trademarks